United States Patent [19]

Miskelly, Jr. et al.

[11] Patent Number: 5,435,128

[45] Date of Patent: Jul. 25, 1995

[54] PYROTECHNICALLY DRIVEN NOZZLE RESTRICTOR

[75] Inventors: Hermann L. Miskelly, Jr., Huntsville; R. Lance Alldredge, Arab; Thomas F. Owens, Huntsville, all of Ala.

[73] Assignee: Thiokol Corporation, Ogden, Utah

[21] Appl. No.: 152,865

[22] Filed: Nov. 15, 1993

[51] Int. Cl.$^6$ .............................................. F02K 1/30
[52] U.S. Cl. ..................................... 60/271; 60/242; 102/381
[58] Field of Search ................. 60/233, 271, 242, 253, 60/254; 102/381

[56] References Cited

U.S. PATENT DOCUMENTS

| | | | |
|---|---|---|---|
| 2,552,497 | 5/1951 | Roach et al. | 60/242 |
| 3,073,112 | 1/1962 | Bleikamp, Jr. | 60/242 |
| 3,150,485 | 9/1964 | Hickerson | 60/271 |
| 3,302,890 | 2/1967 | Silver | 60/242 |
| 3,349,565 | 10/1967 | Williams | 60/254 |
| 3,490,373 | 1/1970 | Fox | 102/381 |
| 3,495,408 | 2/1970 | Frey | 60/242 |
| 3,943,708 | 3/1976 | Panella | 60/242 |
| 3,948,042 | 4/1976 | Beardsley et al. | 60/242 |
| 4,011,720 | 3/1977 | Kirschner, Jr. | 60/254 |
| 4,272,956 | 6/1981 | Lamere et al. | . |
| 4,478,040 | 10/1984 | Johnson | 60/225 |
| 4,495,763 | 1/1985 | Jonson et al. | 60/253 |
| 4,777,795 | 10/1988 | Le Corre et al. | 60/234 |
| 4,817,892 | 4/1989 | Janeke | . |
| 4,821,510 | 4/1989 | Graser et al. | . |
| 4,826,104 | 5/1989 | Bennett et al. | . |
| 4,930,541 | 6/1990 | Solberg | . |

FOREIGN PATENT DOCUMENTS

| | | | |
|---|---|---|---|
| 406209 | 3/1946 | Italy | 102/381 |
| 2238857 | 6/1991 | United Kingdom | 102/381 |

*Primary Examiner*—Timothy S. Thorpe
*Attorney, Agent, or Firm*—Ronald L. Lyons; Madson & Metcalf

[57] ABSTRACT

A pyrotechnically driven device for restricting the area of the nozzle throat in a solid propellant rocket motor is disclosed. In one embodiment, the device includes a piston support mounted to the rocket motor in the exit cone. A restrictor is attached to a piston which is supported by the piston support. The restrictor is movable from a retracted position outside the nozzle throat to a restricting position within the throat upon actuation of the device. The piston and attached restrictor are driven by a pyrotechnic driving means that is actuatable separately from the solid propellant of the rocket motor. A locking means locks the restrictor in its restricting position.

7 Claims, 3 Drawing Sheets

PYROTECHNICALLY DRIVEN NOZZLE RESTRICTOR

FIELD OF THE INVENTION

The present invention relates to a device for restricting the area of a rocket motor nozzle throat in order to boost thrust, and more particularly to a device that includes a restrictor mounted on a piston. The restrictor may be driven into a restricting position once during the rocket's flight by a pyrotechnic charge that is separate from the rocket's propellant charge, and then locked into place.

TECHNICAL BACKGROUND OF THE INVENTION

It is often desirable to alter the thrust produced by a rocket motor during the rocket's flight. In a liquid fuel or hybrid rocket motor, the amount of thrust produced may be controlled by varying the amount of propellant burned. In a solid fuel rocket motor, varying the amount of propellant burned is often impractical. However, thrust may be controlled by altering the exhaust area of the nozzle. Decreasing the area of the nozzle's throat increases pressure inside the motor and thus boosts thrust.

Devices which permit changes in nozzle throat area throughout the entire flight of a rocket are known. These devices typically contain an electrical control system which communicates with a hydraulic system that operates a movable throat restrictor. Such devices permit both increases and decreases in the nozzle throat area.

However, such extensive control is not always necessary. Moreover, such sophisticated control devices include complicated and delicate electrical and hydraulic parts. These parts may be expensive to obtain, install, and maintain, and they are subject to frequent failures due to the high temperatures and pressures present in operating rocket motors.

Other known devices may be actuated only once during the rocket's flight. These devices include a throat restrictor secured by shear pins, explosive bolts, or similar means. Rockets using such devices are generally provided with a relatively large nozzle throat area at launch. At a selected time during the flight, the throat restrictor is released. The throat restrictor is then urged aftward by the rocket motor's exhaust into the nozzle throat, thereby decreasing the throat's area and boosting thrust.

However, these devices rely substantially on the propellant exhaust gases to move the restrictor into position within the nozzle. Moreover, these devices generally contain no mechanical means for restraining or securing a throat restrictor that reaches the desired position within the nozzle. Either deficiency may prevent reliable, precise, and secure throat restrictor placement within the nozzle.

Thus, it would be an advancement in the art to provide a device for boosting solid fuel rocket motor thrust by actively driving a throat restrictor into the nozzle at a desired time during the rocket's flight.

It would be a further advancement to provide such a device which did not substantially rely on the rocket motor's exhaust gases to position the throat restrictor.

It would be an additional advancement to provide such a device which mechanically locks the throat restrictor into the desired position within the nozzle throat.

Such a device is disclosed and claimed herein.

BRIEF SUMMARY OF THE INVENTION

The present invention provides a pyrotechnically driven device for restricting the throat area of a solid fuel rocket motor at a desired time during flight. The device includes a throat restrictor which is mounted for movement from a retracted position outside the nozzle throat to a restricting position within the nozzle throat.

The throat restrictor is supported by a piston which moves from a retracted position to an extended position. The piston is supported by a piston support which is mounted to the rocket motor in the exit cone. At launch, a shearable retaining pin holds the piston in its retracted position.

A pyrotechnic driving means, such as boron potassium nitrate, which is capable of actuation separately from the propellant of the rocket motor is provided to shear the retaining pin and drive the piston from its retracted position to its extended position, thereby driving the restrictor from its retracted position into its restricting position. An initiator means, such as an electrical squib or an explosion-initiated squib, is employed to ignite the pyrotechnic driving means. Hence, the pyrotechnic driving means is capable of ignition separately from the ignition of the rocket motor propellant.

A lock, such as a ball detent system, is employed to lock the restrictor in its restricting position. In one embodiment, the lock includes a spring-loaded ball disposed within a groove in the piston support. The ball is urged into a matching groove in the piston, which moves into position opposite the groove in the piston support as the piston is driven into its extended position. A portion of the ball then resides in each groove to lock the piston in position relative to the piston support and hence to lock the restrictor in its restricting position.

At launch, the piston and restrictor are in their retracted positions. To restrict the nozzle throat area during flight, the pyrotechnic driving means is ignited by actuating the initiator. The pressure on the piston from the combustion of the pyrotechnic driving means forces the piston into its extended position thereby placing the restrictor in its restricting position in the throat of the nozzle. Upon reaching its extended position, the piston is locked into place by the lock.

Thus, it is an object of the present invention to provide a device for boosting solid fuel rocket motor thrust by actively driving a throat restrictor into the nozzle at a desired time during the rocket's flight. It is a further object of the invention to provide such a device which does not substantially rely on the rocket motor's exhaust gases to position the throat restrictor. It is an additional object of the present invention to provide such a device which mechanically locks the throat restrictor into the desired position within the nozzle throat.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
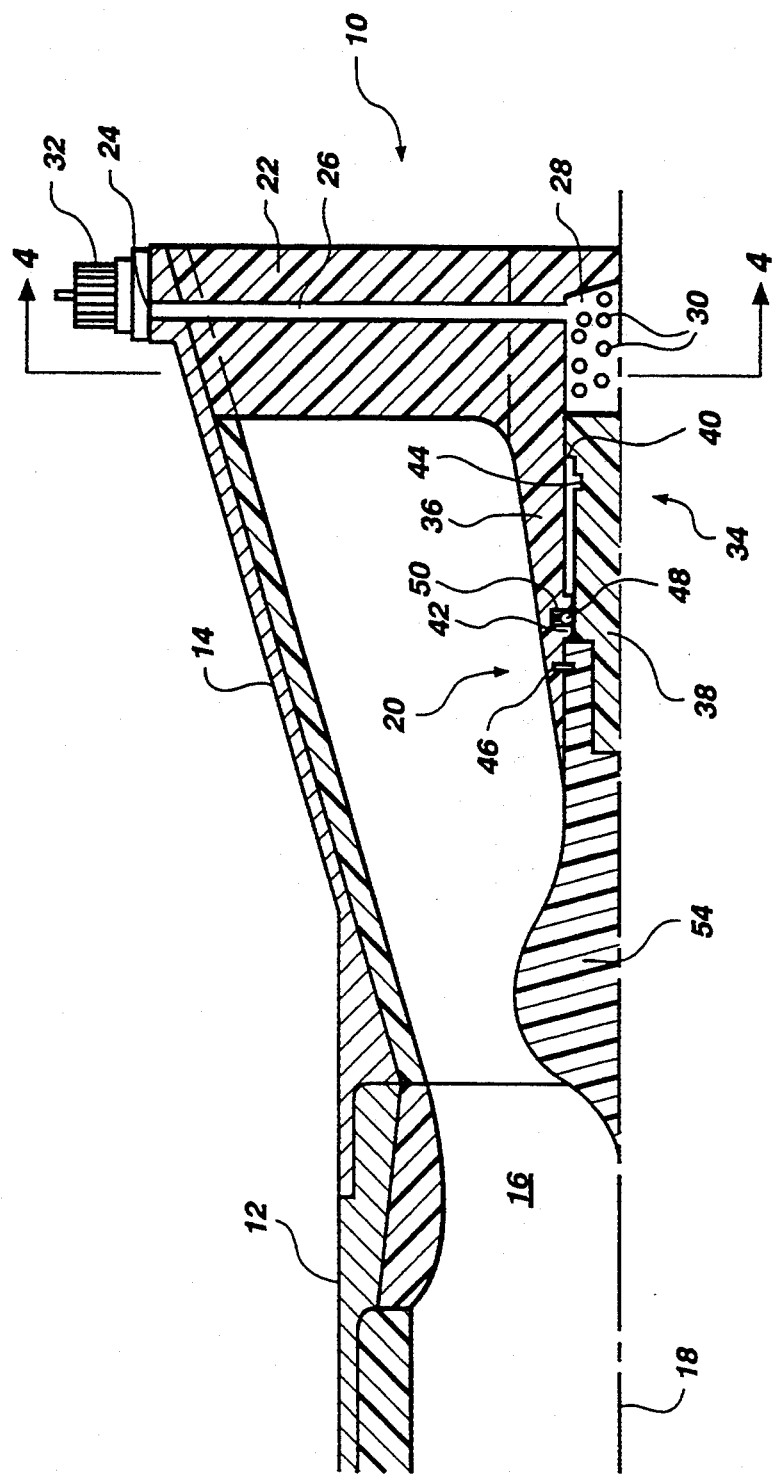
FIG. 1 is a partial cross-sectional view along the rocket's longitudinal axis showing one vane of a throat restrictor device in which the piston and the restrictor are in their retracted positions.

The present invention relates to a device for restricting the throat of a solid fuel rocket motor in order to boost the motor's thrust. With reference to the figures wherein like parts are referred to by like numerals, FIG. 1 shows an embodiment of the present invention designated generally at 10. A rocket motor in which the invention is configured includes a blast tube 12 and an exit cone 14. The rocket motor also has a nozzle throat 16.

Figure 4:
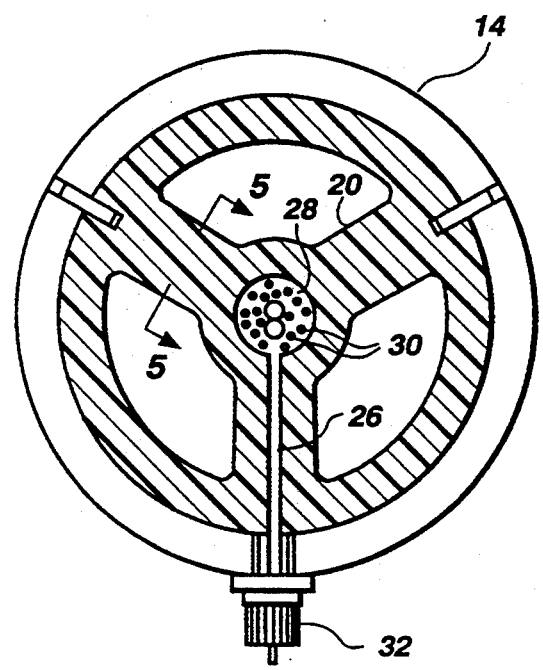
FIG. 4 is a cross-sectional view transverse to the rocket's longitudinal axis along line 4—4 of FIG. 1, showing three vanes of a throat restrictor.
Figure 5:
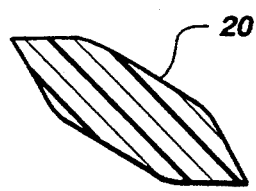
FIG. 5 is a cross-sectional view of a vane taken along line 5—5 of FIG. 4.

The view shown in FIG. 1 is a cross-section taken along the central longitudinal axis 18 of the rocket to illustrate a single vane 20 of the device 10. As FIG. 4 illustrates, additional vanes 20 may also be employed in a given rocket.

As shown in FIG. 1, the vane 20 includes a piston support 22 mounted to the exit cone 14. Placing the device 10 in the exit cone 14 allows the diameter of the blast tube 12 to be minimized, thereby facilitating missile control packaging around the blast tube 12. Such missile control may include a system of actuators, electronics, and one or more power supplies. In addition to making room for these items, mounting the device 10 in the exit cone 14 also enables more propellant to be carried, in contrast to some previous devices which included a restrictor in the blast tube. In such previous devices, the restrictor projected forward into the motor chamber, thereby displacing propellant.

The present invention's piston support 22 has an initiator port 24 which provides access to a tube 26 leading to a chamber 28 within the piston support 22. A pyrotechnic charge 30 is disposed within the chamber 28. As used herein, a pyrotechnic material is one which may be actuated to produce an expanding volume of gas. For instance, the pyrotechnic charge 30 may comprise conventional compositions such as boron potassium nitrate, magnesium polytetrafluoroethylene powder, or black powder.

An initiator 32 is disposed near the initiator port 24, on the exterior of the exit cone 14 to provide firing circuits (not shown) with access to the initiator 32. The initiator 32 may be an electrical squib, such as a squib in which a bridge wire is disposed near a charge. Alternatively, the initiator 30 may be an explosive initiated squib. In any case, the initiator 32 should be capable of producing hot gas that will actuate the pyrotechnic charge 30 after traveling under pressure from the initiator 32 through the tube 26 and into the chamber 28. The tube 26 serves as an explosive transfer line. The interior surface of the tube 26 may be coated with a conventional thin layer explosive.

A piston 34 is disposed for slidable movement adjacent the piston support 22. In the embodiment shown in FIG. 1, the piston 34 comprises a hollow cylindrical vessel 36 disposed about a cylindrical fitting 38 which is configured to slidably engage the vessel 36. The fitting 38 has a flange 40 configured to engage a stop 42 that extends from the vessel 36. The flange 40 contains a groove 44. A shearable retaining pin 46 holds the fitting 38 in place relative to the vessel 36.

A ball 48 is disposed within a groove 50 in the stop 42. The ball 48 is movable from a retracted position, shown in FIGS. 1 and 3, to a locking position, shown in FIG. 2. As shown best in FIG. 3, the ball 48 is biased by a spring 52 or other urging means toward the locking position.

Figure 2:
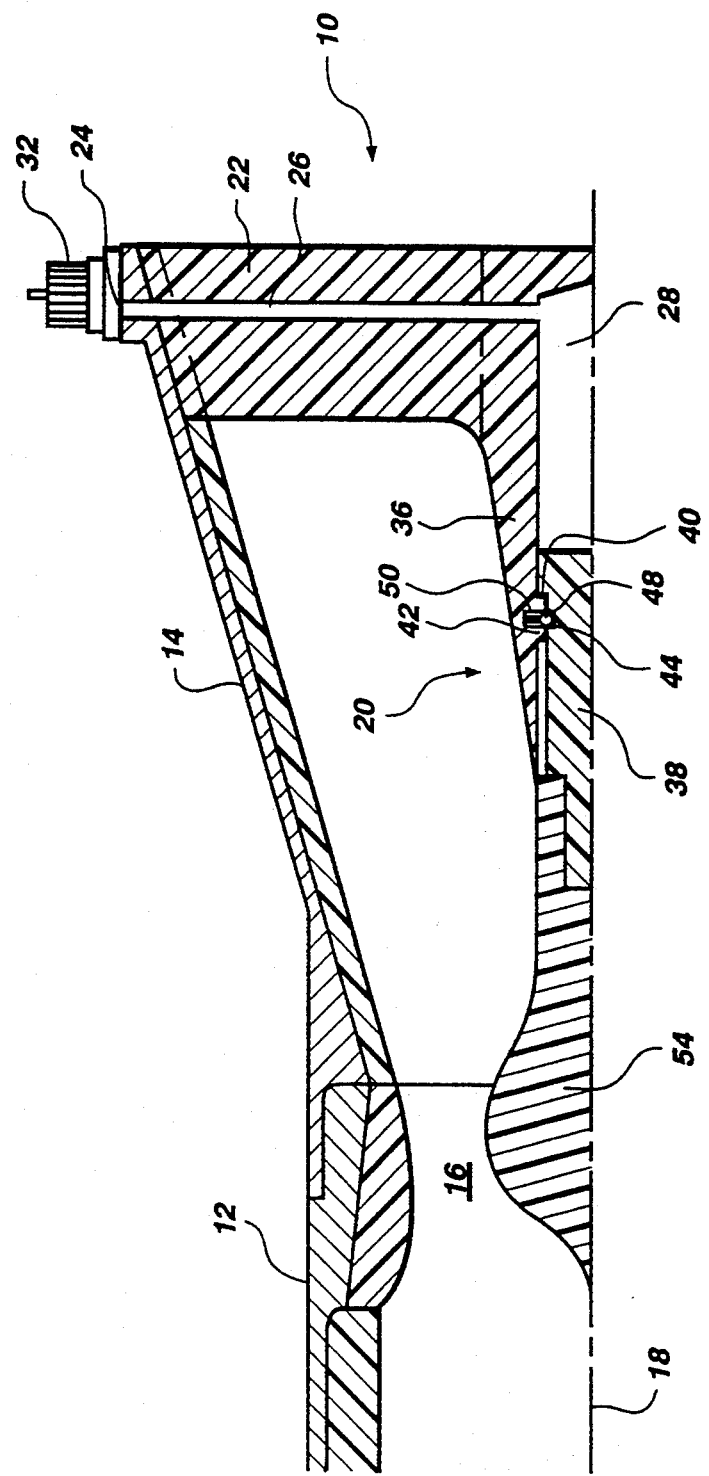
FIG. 2 is a view of the vane as shown in FIG. 1 after the ignited pyrotechnic charge has driven the piston into its extended position and thereby driven the restrictor into its restricting position, and after the lock has engaged the piston to hold the restrictor within the throat.

The ball 48 is configured to permit passage of the fitting 38 from the retracted position shown in FIG. 1 to the extended position shown in FIG. 2. As FIG. 2 illustrates, after the groove 44 near the flange 40 aligns with the groove 50 in the stop 42, the ball 48 moves into a position in both groove 44 and groove 50 to prevent the fitting 38 from returning to its retracted position. It will be appreciated that other similar mechanical locking means may serve in addition to or in place of this ball detent system to maintain the fitting 38 in its extended position.

With reference once more to FIG. 1, a restrictor 54 is attached to the fitting 38. The restrictor 54 may comprise any suitable low-erosion material, such as carbon-carbon, silica phenolic, or carbon phenolic. The restrictor 54 is shaped to permit exhaust gases from the rocket motor to flow past the restrictor 54. The restrictor 54 is also shaped to reduce the area of the throat 16 when the restrictor 54 is in the restricting position shown in FIG. 2.

In operation, the device 10 is configured at launch substantially as shown in FIG. 1, with the restrictor 54 and the fitting 38 in their retracted positions and the pyrotechnic charge 30 intact. The device 10 supports at least three modes of rocket motor operation: boost/sustain mode, boost/boost mode, and boost/sustain/boost mode. The different modes arise from differences in the time during flight when the device 10 is actuated.

Figure 3:
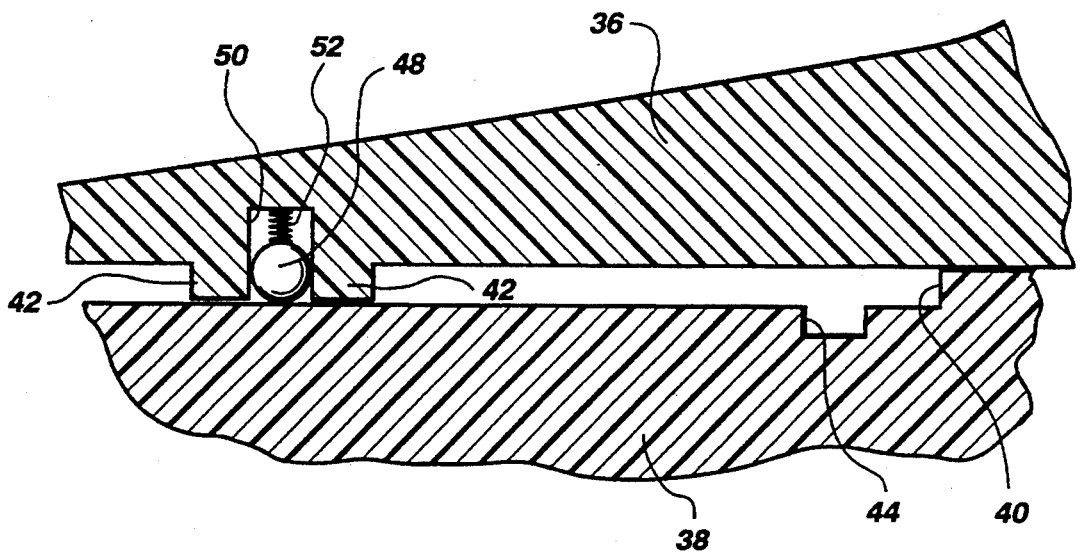
FIG. 3 is an enlarged view of a portion of FIG. 2, further illustrating the biased ball and grooves of the ball detent system.

To actuate the device 10, the initiator 32 is triggered. The hot gas from the initiator 32 in turn ignites the pyrotechnic charge 30. Ignition of the charge 30 creates combustion gases which expand in the confined space of the chamber 28 with explosive force. The explosive force of the pyrotechnic charge 30 is sufficient to shear the retaining pin 46 and to drive the piston 34 into its extended position. The restrictor 54, which is attached to the piston 34, is thus driven by the explosive force into its restricting position, as shown in FIG. 2. In this restricting position, the restrictor decreases the area of the nozzle throat 16, thereby boosting the rocket motor's thrust. The locking ball 48 moves into its locking position as shown in FIGS. 2 and 3 to prevent the restrictor 54 from leaving the restricting position.

The boost/boost mode of operation is achieved by driving the restrictor 54 into the throat 16 immediately following the initial boost phase of the rocket motor. Boost/sustain/boost mode is achieved by driving the restrictor 54 into the nozzle throat 16 at a selected time during the rocket motor's sustain phase. In the boost-/sustain mode, the pyrotechnic charge 30 is not ignited. In this mode, the retaining pin 46 maintains the restrictor outside the throat 16 for the entire flight of the rocket.

In summary, the present invention provides a durable, simple, and relatively inexpensive device for reducing the throat area of a solid fuel rocket motor once during flight in order to boost the motor's thrust. The device may be actuated at any selected time during the rocket's flight. The device places the restrictor in the throat reliably because it does not substantially rely on the rocket motor's exhaust gases to position the throat restrictor. Instead, a separate pyrotechnic charge is used to drive the throat restrictor firmly into its restricting position. The device also mechanically locks the throat restrictor into the desired position within the nozzle throat for increased dependability.

What is claimed and desired to be secured by patent is:

1. A pyrotechnically driven device for restricting the area of a nozzle throat in a solid propellant rocket motor having a central longitudinal axis and an exit cone, said device comprising:
    a piston support mounted to the rocket motor in the exit cone near the exterior of the rocket motor and extending toward the central longitudinal axis of the rocket motor;
    a piston supported by said piston support and movable from a retracted position to an extended position;
    a restrictor attached to said piston for movement from a retracted position outside the nozzle throat when said piston is in said retracted position to a restricting position within the nozzle throat when said piston is in said extended position;
    pyrotechnic driving means for driving said piston from said retracted position to said extended position, thereby driving said restrictor forward into the nozzle throat from said retracted position to said restricting position, said pyrotechnic driving means being actuatable separately from the solid propellant of the rocket motor;
    initiator means for actuating ignition of said pyrotechnic driving means; and
    a lock capable of locking said piston in said extended position.

2. The device of claim 1, wherein said piston has a groove and wherein said lock comprises a biased ball, said ball configured to permit movement of said piston toward said extended position, and said ball biased to engage said groove when said piston reaches said extended position, thereby preventing subsequent movement of said piston back into said retracted position.

3. The device of claim 1, wherein said initiator means comprises an electrical squib.

4. The device of claim 1, wherein said initiator means comprises an explosion-initiated squib.

5. The device of claim 1, further comprising a retaining pin connecting said piston to said piston support for retaining said piston in said retracted position prior to actuation of said pyrotechnic driving means, and wherein said pyrotechnic driving means is configured to produce sufficient force to shear said retaining pin and drive said piston into said extended position.

6. The device of claim 1, wherein said pyrotechnic driving means comprises a composition containing boron potassium nitrate.

7. The device of claim 1, wherein said piston support comprises a hollow cylindrical vessel and said piston comprises a cylindrical fitting configured to slidably engage said vessel, and wherein said restrictor is attached to said fitting.

* * * * *